(12) United States Patent
Stentoft

(10) Patent No.: US 9,879,681 B2
(45) Date of Patent: Jan. 30, 2018

(54) HEATING CIRCULATION PUMP

(75) Inventor: Mikkel Rind Stentoft, Randers (DK)

(73) Assignee: Grundfos Management a/s, Bjerringbro (DK)

( * ) Notice: Subject to any disclaimer, the term of this patent is extended or adjusted under 35 U.S.C. 154(b) by 284 days.

(21) Appl. No.: 14/004,273

(22) PCT Filed: Feb. 24, 2012

(86) PCT No.: PCT/EP2012/053215
§ 371 (c)(1),
(2), (4) Date: Nov. 6, 2013

(87) PCT Pub. No.: WO2012/123234
PCT Pub. Date: Sep. 20, 2012

(65) Prior Publication Data
US 2014/0056741 A1    Feb. 27, 2014

(30) Foreign Application Priority Data
Mar. 12, 2011    (EP) .................................... 11002074

(51) Int. Cl.
| F04D 13/06 | (2006.01) |
| H02K 5/04 | (2006.01) |
| H02K 5/22 | (2006.01) |
| H02K 11/33 | (2016.01) |

(52) U.S. Cl.
CPC ....... *F04D 13/0693* (2013.01); *F04D 13/064* (2013.01); *H02K 5/04* (2013.01); *H02K 5/225* (2013.01); *H02K 11/33* (2016.01)

(58) Field of Classification Search
CPC .............. F04D 13/064; F04D 13/0693; H02K 11/0073; H02K 5/225; H02K 11/33; H02K 5/04
See application file for complete search history.

(56) References Cited

U.S. PATENT DOCUMENTS

| 3,545,889 A | 12/1970 | Pensabene | |
| 5,049,770 A * | 9/1991 | Gaeth | F02B 63/06 310/43 |
| 5,644,178 A * | 7/1997 | Halm | H02K 3/50 310/43 |

(Continued)

FOREIGN PATENT DOCUMENTS

| CN | 101589237 A | 11/2009 |
| DE | 19646617 A1 | 5/1998 |

(Continued)

OTHER PUBLICATIONS

Office Action dated Jun. 3, 2015 in CN App No. 201280013113.4.

(Continued)

*Primary Examiner* — Dominick L Plakkoottam
(74) *Attorney, Agent, or Firm* — Panitch Schwarze Belisario & Nadel LLP

(57) ABSTRACT

The heating circulation pump includes a pump housing with a pump impeller which is arranged therein and which is driven by an electric motor whose stator housing includes a flange, which connects to the pump housing. The heating circulation pump includes a terminal box housing for at least the electric connection of the motor. The terminal box housing engages over the stator housing from the side which is away from the pump, to into the region of the flange.

13 Claims, 6 Drawing Sheets

(56) References Cited

U.S. PATENT DOCUMENTS

| | | | | |
|---|---|---|---|---|
| 6,065,946 A | * | 5/2000 | Lathrop | F04B 49/065 |
| | | | | 310/43 |
| 6,229,240 B1 | * | 5/2001 | Kech | H02K 3/47 |
| | | | | 242/433 |
| 6,720,689 B2 | * | 4/2004 | Agnes | H02K 1/185 |
| | | | | 310/43 |
| 8,562,313 B2 | * | 10/2013 | Andersen | H02K 3/50 |
| | | | | 29/596 |
| 2002/0081888 A1 | * | 6/2002 | Regnier | H01R 13/6273 |
| | | | | 439/352 |
| 2010/0090635 A1 | * | 4/2010 | Andersen | F04D 29/628 |
| | | | | 318/490 |
| 2011/0241454 A1 | * | 10/2011 | Staehr | F04D 29/406 |
| | | | | 310/43 |

FOREIGN PATENT DOCUMENTS

| | | |
|---|---|---|
| DE | 102004030721 B3 | 10/2005 |
| EP | 1460748 A1 | 9/2004 |
| FR | 1532766 A | 7/1968 |
| JP | 2007-309242 A | 11/2007 |

OTHER PUBLICATIONS

Int'l Search Report dated May 16, 2012 in Int'l Application No. PCT/EP2012/053215.
Office Action dated Aug. 12, 2016 in CN Application No. 201280013113.4.

\* cited by examiner

HEATING CIRCULATION PUMP

CROSS-REFERENCE TO RELATED APPLICATIONS

This application is a Section 371/Continuation of International Application No. PCT/EP2012/053215, filed Feb. 24, 2012, which was published in the German language on Sep. 20, 2012, under International Publication No. WO 2012/123234 A1 and the disclosure of which is incorporated herein by reference.

BACKGROUND OF THE INVENTION

Embodiments of the invention relate to a heating circulation pump.

Such heating typically comprise a pump housing with a suction connection and a pressure connection as well as a pump impeller arranged therein. An electric motor is provided for the drive of the pump impeller, whose shaft carries the pump impeller. The stator surrounding the rotor is arranged in a housing which on its side facing the pump housing comprises a flange or similar connection element, via which the motor housing, in particular the stator housing is connected to the pump housing. For the electric connection of the motor, a terminal box housing is provided, which is arranged on the axial side of the stator housing which is away from the pump housing and forms the lower part of the terminal box. The terminal box housing typically also comprises the motor electronics, thus for example a frequency converter. A heating pump of the previously mentioned type is typically known from DE 10 2004 030 721 B3.

Such heating circulation pumps of smaller or medium construction type are manufactured on a large scale, which is why even the smallest of improvements could already lead to a large saving with the manufacture and/or assembly. One constantly strives to improve these pumps on the one hand with regard to technology and to design them such that they are more reliable, and on the other hand to lower the manufacturing and assembly costs.

BRIEF SUMMARY OF THE INVENTION

The heating circulation pump according to the invention comprises a pump housing with at least one pump impeller which is arranged therein and which is driven by an electric motor. The housing of the electric motor which receives the stator comprises a connection element, in particular a flange, which connects to the pump hosing and via which the electric motor is mechanically connected to the pump housing. Moreover, the heating circulation pump according to the invention comprises a terminal box housing for at least the electric connection of the motor, said terminal box housing being arranged at the axial side of the stator housing which is away from the pump housing. According to the invention, the terminal box housing is designed and arranged such that it engages over the stator housing to into the region of the connection element, in particular of the flange, wherein the engaging-over part is formed as one piece with the terminal box housing.

The basic concept of the solution according to the invention is thus to provide a terminal box housing which not only forms the actual terminal box or an essential part of this, but moreover also yet engages over the stator housing to a large extent or completely.

The pump housing or the part of the pump housing which engages over the stator and the stator housing do not necessarily need to be a separate component, for example a metal cast part, but may also be designed in the form of a cast body as one piece with the motor winding, as is known per se with stator windings embedded in plastic.

If hereinafter one speaks of a flange, then this is to represent any connection elements, such as for example a connection fixation or other suitable connections, as they are known for connection to the pump.

What is meant by in the region of the flange in the context of the invention, is that the terminal box either completely engages over the stator housing, i.e. including the flange or that the terminal box housing ends in the region of the flange or that the terminal box housing ends at or shortly before the flange. The latter may be useful for example, so that the screw heads of the screws connecting the pump housing to the flange are still accessible on the motor side or if for example the motor housing is designed in a mechanically reinforced manner directly in the flange region.

The solution according to the invention has numerous advantages. Inasmuch as the terminal box housing engages over the stator housing, given a suitable design of the terminal box housing, this stator housing is neither accessible nor visible in this. Thus the stator housing does not need to be machined or processed in this region, i.e. in particular with a metallic cast housing it does not need to be painted for example. Moreover, this design creates the possibility of realising a uniform cylindrical, conical or differently geometrically fashioned outer shape of the pump in the region of the motor and terminal box, independently of the stator size, i.e. independently of the length and the diameter of the stator. One may not only achieve a particularly pleasing fashioning by way of this, but moreover there is the possibility of providing stator housings of a different size with the same terminal box housing, given a suitable design of the terminal box housing, so that on the one hand the variety of parts is reduced and on the other hand pumps of a different power may correspond to one another with regard to their external dimensions, which in particular entails advantages also with the packaging and storage.

According to an advantageous design of the invention, the terminal box housing is designed such that it engages over the stator housing up to the flange, thus reaches directly up to the flange. Alternatively, according to the invention, one envisages designing the terminal box housing such that it engages over the stator housing as well as the flange. This design has the advantage that neither the stator housing nor the flange are to be processed or machined, in particular painted, on the outer side. The surfaces may also remain comparatively coarsely structured, without this having any effect on the quality impression of the pump, since it is only then the terminal box housing which is visible and manually reachable in this region.

Advantageously, the heating circulation pump according to the invention is designed as a wet-runner, i.e. it comprises a wet-running motor, with which the rotor of the motor runs in a can which is typically filled with delivery fluid. In particular with this motor construction type, it is useful to design the terminal box housing such that it forms a terminal box with a sealingly closed base which preferably is yet axially distanced from the stator housing. The distancing of the base from the stator housing in particular effects a thermal decoupling, but it also has the effect that less vibration is transmitted by the motor onto the terminal box. By way of the sealed design of the terminal box base, one ensures that no delivery fluid may get from the motor into the terminal box, as could otherwise occur with leakage in the region of motor/pump. In particular, even with a slight leakage or formation of condensation water, this arrangement reliably prevents a penetration of moisture into the terminal box and the sensitive electronics which are located therein as the case may be.

To the other side, specifically to the axial side which is away from the stator housing, the terminal box is advantageously sealed by way of a cover, i.e. for example amid the integration of a seal. Thus a completely sealed terminal box results whose inside is reliably protected from the penetration of fluid. Alternatively, according to the invention, the terminal box housing may be designed in a cap-like manner and open to the stator housing. Such a design in particular makes sense if the stator housing is designed in an open manner at its free axial end. It may then be formed with a cap-like terminal box housing of the terminal box itself, which is then open to the stator, as well as a casing which engages over the stator housing, wherein a sealed termination or closure of the terminal box or the motor, to the outer environment may be ensured by way of an annular seal, for example an O-ring between the engaging-over part of the terminal box housing and the stator housing.

In order to fasten the terminal box housing on the stator housing, according to the invention, at least one snap connection is provided between the terminal box housing and the stator housing and/or between the terminal box housing and the flange. Such a snap connection is particularly advantageous with regard to manufacturing technology, since the terminal box housing may be fastened by way of strong pushing onto the stator housing and/or the flange. Thereby, the snap connection or the snap connections are advantageously designed such that they are not releasable or at least difficult to release. Such an arrangement further has the advantage that it is ensured that unprofessional third parties may not remove the terminal box housing and thus may not reach the live parts of the motor or of the motor electronics.

Advantageously, a snap connection is provided by way of at least one snap projection and a snap recess which is arranged correspondingly to this, and specifically in the region between the peripheral surface of the stator housing and the engaging-over part of the terminal box housing. Thereby, a snap recess in the context of the invention is not necessarily to be understood as an opening, but here a recessed portion, an edge behind which something may grip or likewise, into which the snap projection engages after elastic deflection, is sufficient. One or more such snap connections between the stator housing and the engaging-over part of the terminal box housing are particularly advantageous, since large-surfaced snap projections and snap recesses may be arranged in this region, since this region is otherwise essentially not utilised. Moreover, large-surfaced snap connections may also transmit comparatively large forces, i.e. form a greater resistance to an undesired release.

According to an advantageous further development of the invention, a snap connection is provided, which comprises at least one snap projection and a snap recess which is arranged correspondingly to this, in the region between the base of the terminal box and the axial side of the stator housing. Thereby, according to the invention, one may also utilise radially and axial engaging snap connections in combination. The arrangement of a snap connection in the axial region is particularly advantageous in combination with a plug which is located there, for the electrical connection of the connection terminals which are located in the terminal box, and, as the case may be the motor electronics, to the motor winding.

With regard to design, it is simple if the snap connection comprises one or preferably two or more snap projections engaging on the flange, on the terminal box housing. The flange for this requires no or only slight modification. The snap projections either engage behind the flange where an adequate free space with respect to the pump housing is formed, or however corresponding free spaces or snap recesses are provided on the flange.

If, as is advantageous, snap projections are integrally formed in the region of the terminal box housing, in which this engages over the stator housing, then according to an advantageous further development of the invention, a material weakening may be provided in the region of such a snap projection, in order to provide the snap projection with the necessary deflection capability in this region, in order to be able to deflect on assembly. Such a material weakening may be formed by a slot-like recess in a simple manner. Such a slot-like recess, for example in the engaging-over part of the terminal box may be formed by longitudinally running, thus axis-parallel slots between snap projections distributed over the periphery, or however also by way of radially running slots, in the direct vicinity to the respective snap projections.

If the base of the terminal box is designed in a closed manner, which is advantageous, then at least electric contacts are to be led through. Advantageously, the feeding-through of the contact to the motor is designed in the manner of a plug of an electrical plug connection, wherein a socket of this plug connection is formed in the stator housing. With such an arrangement, the terminal box housing may not only be mechanically fastened on the stator housing with practically only one grip, but thereby the electrical plug connection is simultaneously closed by way of the plug and the socket being inserted into one another in a correct manner. With such an arrangement, it is particularly advantageous to provide a snap connection in the region between the plug and the socket, in order to secure the electrical plug connection with an as close as possible contact. For this, usefully e.g. a wedge-like snap projection is provided on the plug and engages into a snap recess in the axial end-wall of the stator housing, said end-wall forming part of the socket.

The heating circulation pump according to the invention advantageously comprises a terminal box housing which is designed as a plastic injection moulded part. Then it is useful to form the terminal box housing in the region engaging over the stator housing, in a manner widening towards to pump, thus for example with a slightly conical shape. Such a shape is not only aesthetically pleasing, but it is particularly favourable with regard to tooling, since it is easy to remove from the moulding tool. Such plastic injection moulded parts are particularly inexpensive to manufacture with large scale manufacture. The stator housing typically consists of metal and is designed as a cast housing, but can however also be formed from another suitable material.

If, as may be provided according to one development of the invention, the terminal box housing not only engages over the stator housing but also the flange, then this usefully likewise comprises recesses which are flush with the recesses in the flange and through which the bolts, in particular screws are led, wherein these connect the flange on the stator housing to a flange on the pump housing or to the pump housing. With such a design, it may be useful to recess the terminal box housing also in the region surrounding the recesses, so that screw heads or bolts have enough free space in this region, or this region is accessible with a tool.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is hereinafter explained in detail by way of one embodiment represented in the drawing. There are shown in:

In the drawings:

FIG. 1 is a heating circulation pump according to the invention, in a simplified schematic perspective representation;

FIG. 2 is a longitudinal section through the pump according to FIG. 1;

FIG. 3 is a perspective view of the pump according to FIG. 1, with a removed terminal box housing;

FIG. 4 is a view of the terminal box housing, from the motor side;

FIG. 5 is a side elevation view of a second embodiment of a heat circulation pump in accordance with the invention; and FIG. 6 is a perspective view of the pump of FIG. 5 with the terminal box housing separated from the pump.

DETAILED DESCRIPTION OF THE INVENTION

Figure 1:
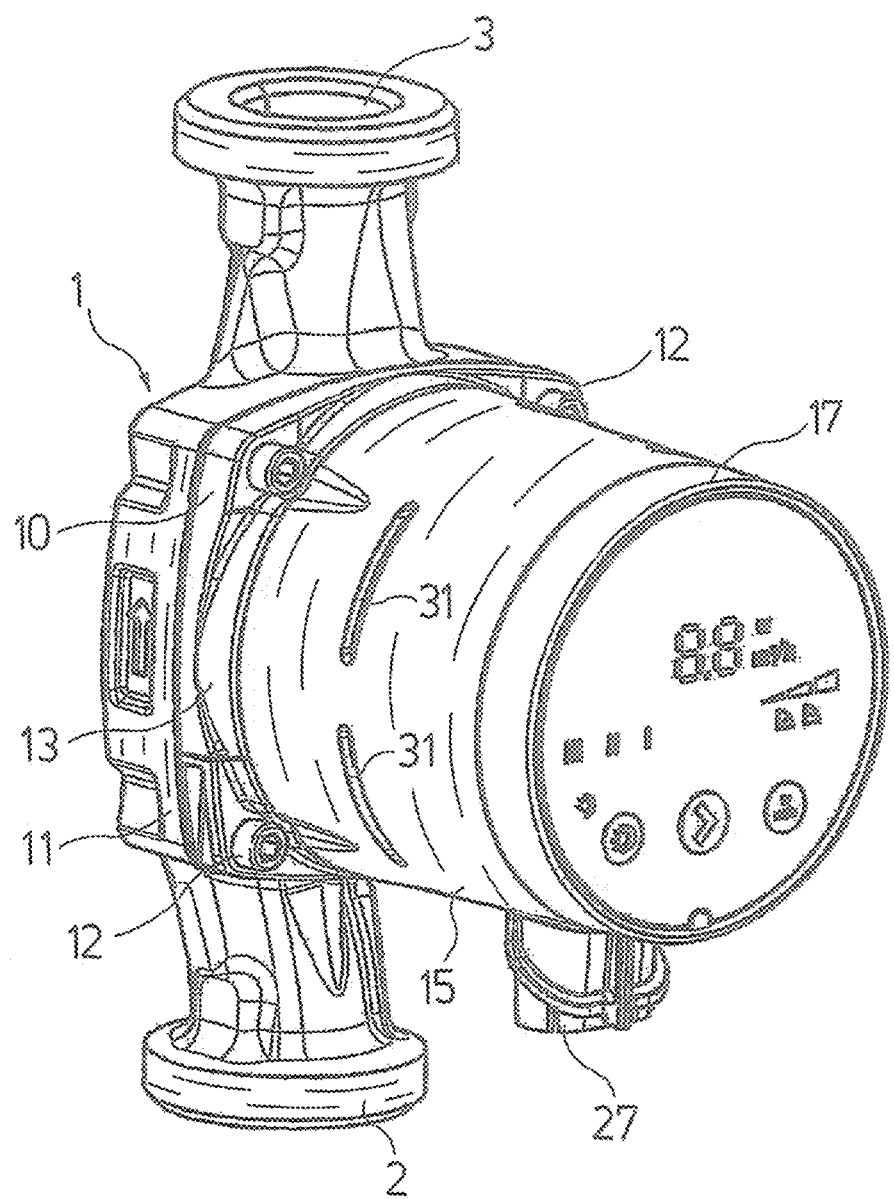
Figure 2:
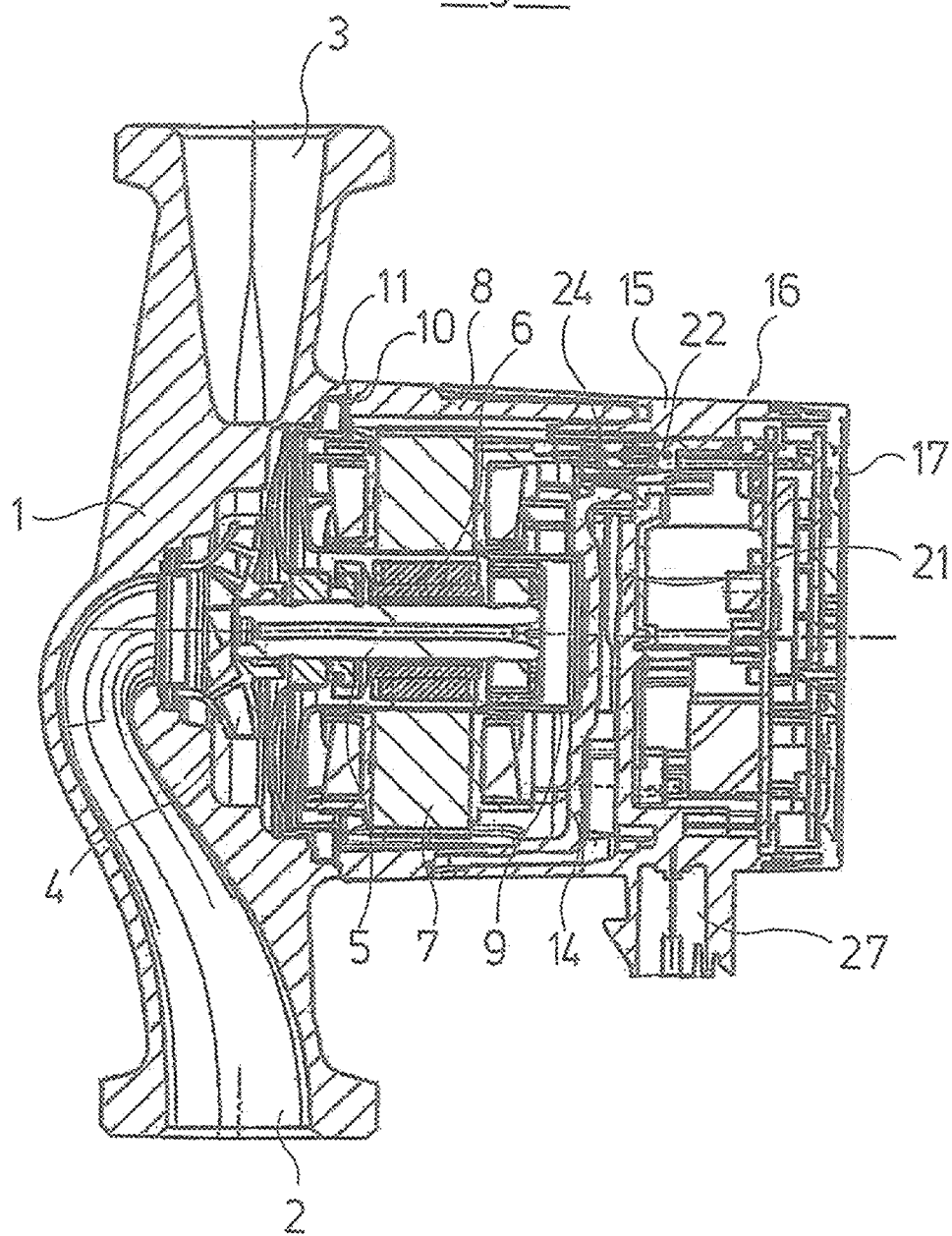

The heating circulation pump which is represented by way of the figures comprises a pump housing 1 with a suction channel 2 and a pressure channel 3. A pump impeller 4 is rotatably arranged in the pump housing 1, in order in a manner known per se to deliver delivery fluid from the suction channel 2 into the pressure channel 3 in a pressure-increasing manner by way of rotation of the pump impeller 4. The pump impeller 4 is seated on a shaft 5 which at the same time carries a rotor 6 of an electric motor whose stator 7 is arranged in a stator housing 8. The electric motor is designed as a wet-running motor and comprises a can 9 between the rotor 6 and stator 7 and which is filled with fluid.

The pump housing 1 is designed in an open manner to the stator housing 8. The stator housing 8 at its pump-side end comprises a flange 10 which connects to a flange 11 of the pump housing 1 and has a rounded square contour. Since the remaining stator housing 8 is designed in a round manner, sections result, in which the flange 10 projects laterally beyond the remaining stator housing 8, and these are provided with recesses. Screws 12 are led into these recesses, and the motor-side flange 10 is fastened on the pump-side flange 11 with these screws.

The flange 10 is reinforced by an annular section 13 which however is recessed in the region of the corners, in order here to provide adequate free space for the heads of the screws 12. Otherwise, the stator housing 8 extends from the flange 10 with its annular reinforcing section 13 roughly in a cylinder-like manner parallel to the rotation axis of the shaft 5 at a distance to the can 9 and amid the inclusion of the stator 7, away from the pump. The stator housing 8 at the axial side which is away from the pump housing 1 is closed off by an end-wall 14. The pump housing 1 and the stator housing 8 consist of cast metal.

A terminal box hosing 15 is designed of plastic and comprises a terminal box 16 which at the end-side of the stator housing 8 which is away from the pump housing 1 extends in the direction of the rotation axis of the pump impeller 4 and is closed off at the end-side by a cover 17, amid the integration of a seal. The terminal box housing 15 however not only forms the terminal box 16 but also laps or engages over the part of the stator housing 8 which is remote from the pump, at the axial side of this stator housing, and peripherally up to the flange 10 or its annular reinforcement section 13. The terminal box housing 15 in the region engaging over the stator housing 8 is designed in an essentially cylindrical manner, but the pump runs out in a slightly widened manner towards the pump, completely encloses the stator housing 8 and ends in a flush manner on the annular section 13 of the flange 10. The part of the terminal box housing 15 which engages over the stator housing 8, in the engaging-over region however not only forms a casing of the stator housing 8 but also part of the fastening of this component on the stator housing 8.

The terminal box housing 15 is connected to the stator housing 8 by way of snap connections and is pushed onto the stator housing 8 from the axial side of this which is remote to the pump. For this, two snap projections 18 are provided, which are arranged offset by 120° to one another on the inner side of the part of the terminal box housing 15 which projects beyond the stator housing 8, and these snap projections are roughly wedge-like in cross section, so that these firstly deflect radially outwards on pushing onto the stator housing 8, in order then to snap into corresponding snap recesses 19 provided on the stator housing 8 on the outer side in a corresponding manner, by way of the elastic restoring force of the material.

Whereas the snap projections 18 engage on the outer periphery of the stator housing 8, a further snap projection 20 is provided on a plug 22 which is integrally formed in the base 21 of the terminal box 16 and which is likewise arranged offset by 120° to the two snap projections 18, and snaps into a recess 23 of the end-wall 14 of the stator housing 8 and engages there. The terminal box housing 15 in this embodiment is thus fastened with three snap connections which are arranged offset by 120°, with respect to the periphery, of which two are peripherally effective and the third engages in an axial manner.

Figure 3:
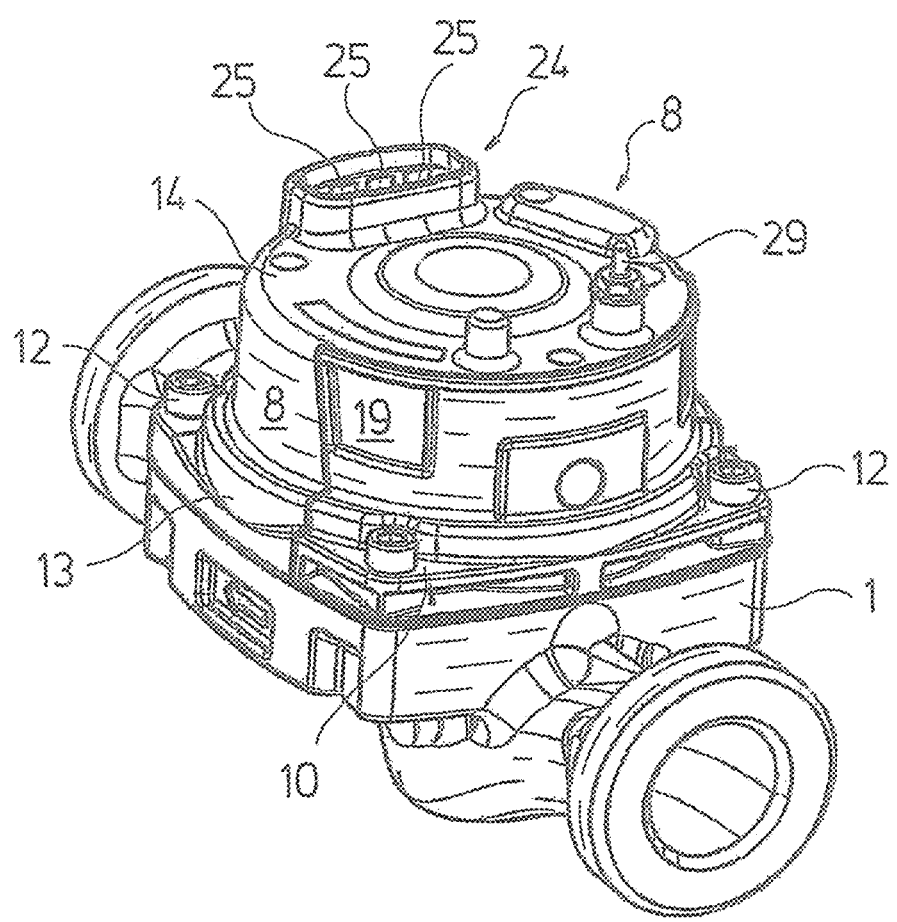
Figure 4:
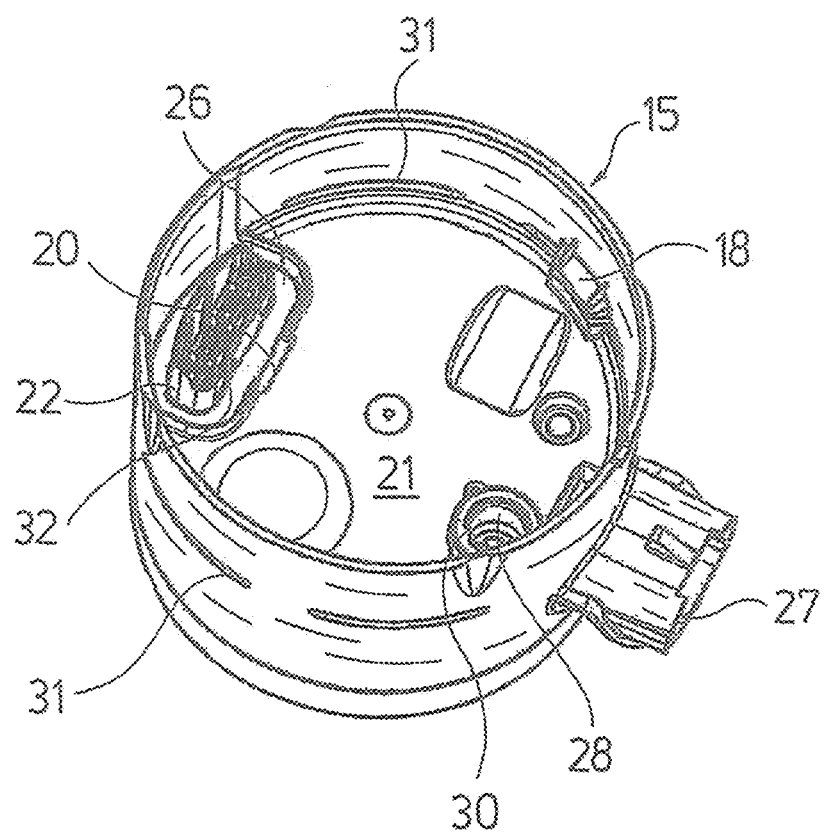

The stator housing 8 in the region of the electric connection is designed as a socket 24 which receives the plug 22 in a locking manner. Three electric contacts 25 are represented in FIGS. 3 and 4, which are electrically conductively connected to one another by way of this plug connection. Due to the fact that a snap projection is integrally formed on the plug 22, in particular this electrical plug connection is secured separately, wherein this snap connection simultaneously also serves for fastening the terminal box housing 15 on the stator housing 8.

The electric contacts 25 of the plug 22 are formed in the base 21 of the terminal box and thus also sealed off with respect to the surrounding plastic material. Additionally, a peripheral seal 26 surrounding the contacts 25 is provided, which additionally ensures the sealing between the socket 24 of the stator housing 8 and the base 21 of the terminal box 16. The motor electronics which are located in the terminal box 16 and which are not the subject matter of the present invention are not represented and described in detail here. The electric connection lead may be connected via a socket 27 which is integrally formed laterally thus radially on the terminal box 16, into which socket a standardised connection plug may be inserted.

A circular recess 28 is provided in the base 21 of the terminal box 16 in a manner lying roughly oppositely to the plug 22 (in FIG. 4) and this recess is envisaged for leading through an earth pin 29 which projects on the stator housing 8 on the rear side, thus on the axial side which is away from the pump housing 1 and which projects into the terminal box 16 (in the assembled condition) for the further electrical contacting. In order to ensure a sealing also with respect to this, an O-ring 30 is provided, which surrounds the recess 28 and seals with respect to a cylindrical projection on the stator housing 8, at whose end the earth pin 29 is arranged.

The terminal box housing 15 is designed as a single-piece plastic injection moulded part. Since the stator housing 8 is to be seen as being practically rigid with respect to the terminal box housing 15, for manufacture of the snap connections, the respective snap projection 18 and 20 must deflect amid the utilisation of the elasticity of the material. For this, a material weakening of the wall of the terminal box housing 15 is provided. Inasmuch as it concerns the snap projections 18, such a material weakening is given by slots 31 which are arranged directly behind the snap projection 18 and extend over a width corresponding roughly to double the width of the snap projection and being a few millimeters wide. These slots 31 are however not only arranged in the region of the two snap projections 18, but also in an oppositely lying manner, so that a certain ventilation of the space between the stator housing 8 and the base 21 of the terminal box may be effected by way of these slots.

Inasmuch as it concerns the plug 22, this is weakened in the region next to the snap projection 20 by way of slots 32. These slots 32 extend in the plug-in direction, so that the sap projection 20 is arranged at the end of a tongue which is formed by the slots and which may spring in transversely to the plug direction.

Figure 5:
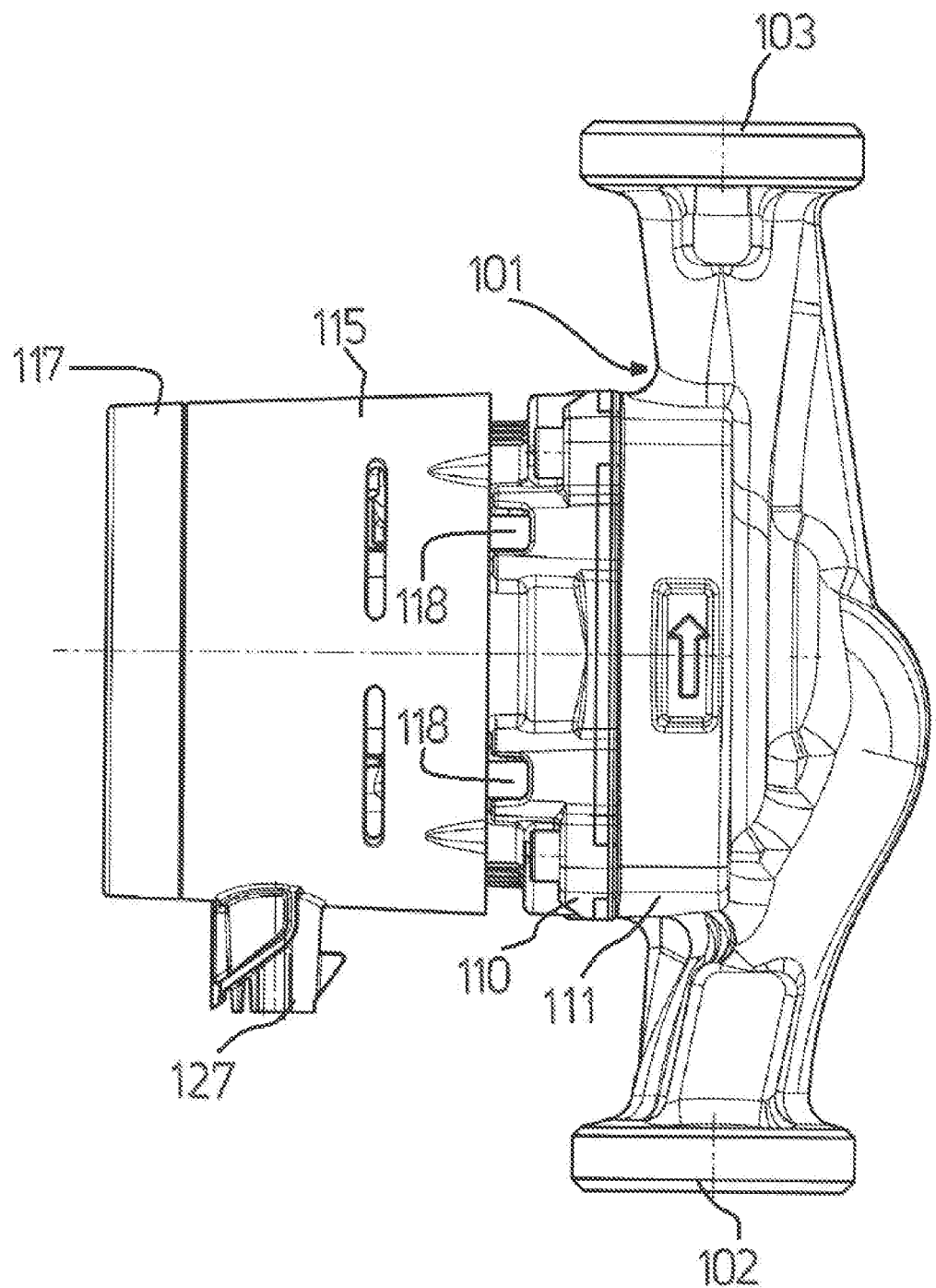
Figure 6:
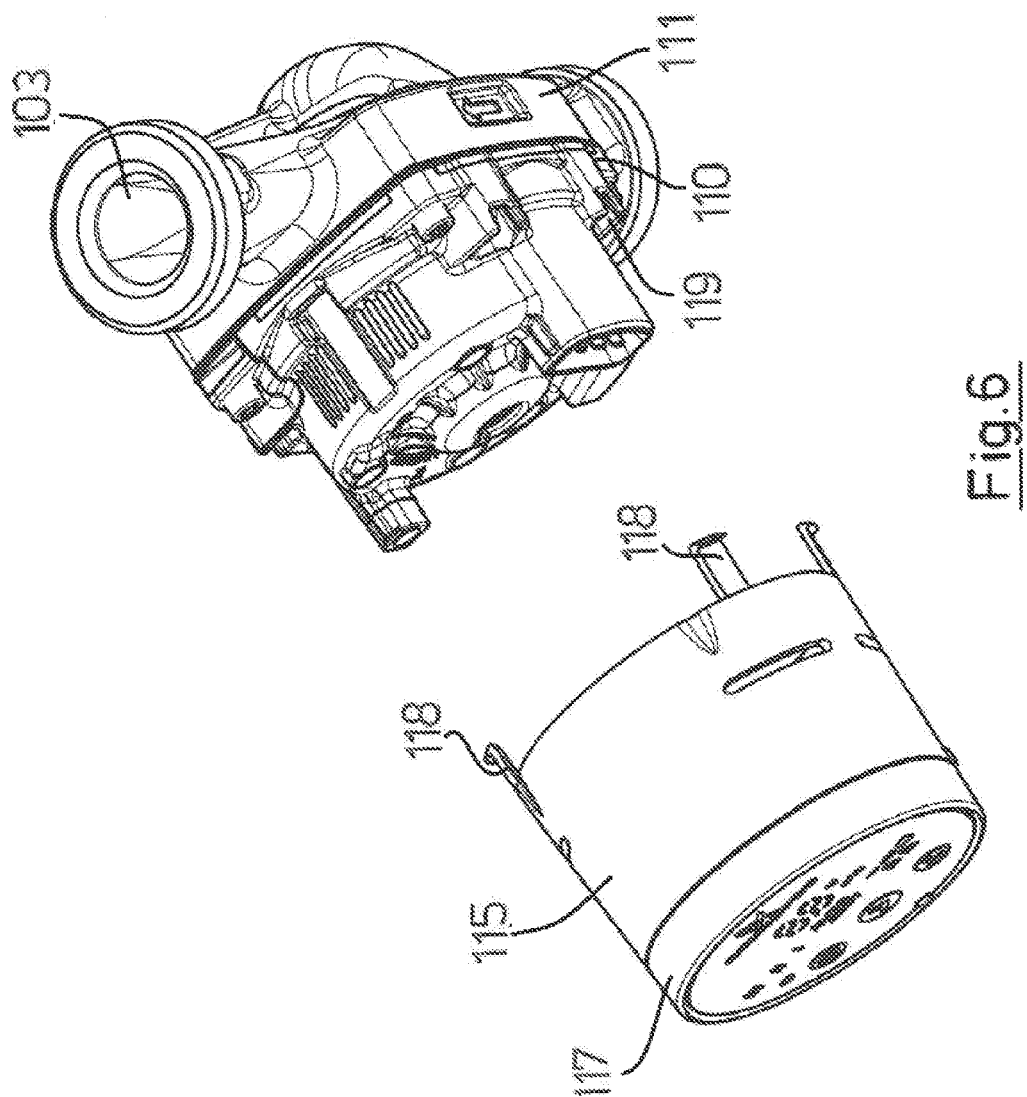

FIGS. 5 and 6 show a second embodiment of the pump. The second embodiment is similar to the embodiment described above. Like numerals have been used for like elements, except the 100 series numerals have been used for the second embodiment. Accordingly, a complete description of the second embodiment has been omitted, with only the differences being described.

In the second embodiment, the terminal box housing 115 is fastened on the flange 110 by way of at least one snap connection 118, 119. Preferably, the snap connection includes at least one, and preferably two or more snap projections 118 arranged on the terminal box housing 115, which engage with corresponding snap recesses 119 provided on the flange 110.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A heating circulation pump with a pump housing (1) with at least one pump impeller (4) which is arranged therein and which is driven by a wet-running electric motor (6, 7) whose stator housing (8) comprises a connection element, in particular a flange (10), which connects to the pump housing (1), and with a terminal box housing (15) containing motor electronics for at least the electric connection of the motor (6, 7), said terminal box housing being arranged on the axial side of the stator housing (8) which is away from the pump housing (1), wherein the terminal box housing (15) engages over the stator housing (8) into the region of the connection element (10), wherein the engaging-over part is designed as one piece with the terminal box housing (15), the terminal box housing being a terminal box (16) with a base (21) that sealingly closes the terminal box, the base (21) being movable with the terminal box (16) and being opposite and axially distanced from an axial end-wall (14) of the stator housing (8), the axial end-wall (14) closing off the stator housing (8) at the axial side which is away from the pump housing (1), wherein the terminal box housing (15) is fastened on an external circumference of the stator housing (8) and/or on the flange (10) by way of at least one snap connection (18, 19), and wherein the base is arranged between the motor electronics and the axial end-wall of the stator housing.

2. A heating circulation pump according to claim 1, wherein the terminal box housing (15) engages over the stator housing (8) up to the flange (10).

3. A heating circulation pump according to claim 1, wherein the terminal box housing engages over the stator housing and the flange.

4. A heating circulation pump according to claim 1, wherein the terminal box housing (15) at its side which is away from the stator housing (8) is sealingly closed by way of a cover (17).

5. A heating circulation pump according to claim 1, wherein the terminal box housing is cap-shaped and is designed open towards the stator housing.

6. A heating circulation pump according to claim 1, wherein the snap connection comprises at least one snap projection (18) and a snap recess (19) arranged corresponding to this, in the region between the peripheral surface of the stator housing (8) and the engaging-over part of the terminal box housing (15).

7. A heating circulation pump according to claim 1, wherein the snap connection comprises one or more snap projections on the terminal box housing, which engage on the flange.

8. A heating circulation pump according to claim 1, further comprising at least one snap projection (20) and a snap recess which is arranged corresponding to this, in the region between the base (21) of the terminal box (16) and the axial side of the stator housing (8).

9. A heating circulation pump according to claim 1, wherein the terminal box housing (15) in its region which engages over the stator housing (8), on the inner side, comprises the at least one snap connection (18) and a material weakening in the form of a slot-like recess (31).

10. A heating circulation pump according to claim 1, wherein electrical contacts (25) are led through the base of the terminal box (16), wherein the feeding-through of the contacts is designed in the manner of a plug (22) of an electrical plug connection, wherein a socket (24) of the plug connection is formed in the stator housing (8).

11. A heating circulation pump according to claim 10, wherein a snap projection (20) is formed on the plug (22) and engages into a snap recess in the axial end-wall (14) of the stator housing (8) which forms part of the socket (24).

12. A heating circulation pump according to claim 1, wherein the terminal box housing (15) is designed as a plastic injection moulded part and in the region engaging over the stator housing (8) is designed widening towards the pump.

13. A heating circulation pump according to claim 1, wherein the terminal box housing engages over the stator housing and the flange and recesses are provided in the terminal box housing in a manner flush with recesses in the flange, through which recesses in the terminal box housing bolts are led, which connect the flange on the stator housing to the pump housing.

\* \* \* \* \*